July 18, 1967  J. TSCHUDY, JR  3,331,340

WATERING APPARATUS OF SEED PLANTER

Filed Jan. 3, 1966

INVENTOR.
JAY TSCHUDY, Jr.
BY
*Willard S. Gwenn*
ATTORNEY

United States Patent Office 3,331,340
Patented July 18, 1967

3,331,340
WATERING APPARATUS OF SEED PLANTER
Jay Tschudy, Jr., Shawnee Mission, Kans., assignor to Precision Agricultural Machinery Company, Phoenix, Ariz., a corporation of Arizona
Filed Jan. 3, 1966, Ser. No. 518,122
2 Claims. (Cl. 111—6)

ABSTRACT OF THE DISCLOSURE

A precision seed planting apparatus including a watering device which is timed with the precision seeder so as to provide a supply of water, fertilizer and mulch, to spaced planted seed groups along a plant row to promote rapid and efficient germination of the seedling plants.

---

This invention pertains to watering devices for seed planters and is particularly directed to timing apparatus for watering devices associated with precision seed planters.

This invention pertains to improvements in watering apparatus associated with precision seed planters such as shown in Patent No. 3,154,031, issued Oct. 27, 1964.

One of the objects of this invention is to provide a timing apparatus for a trailing watering device of a precision seed planter which is simple in construction, easy to mount and service, and which is rugged, accurate and dependable in operation.

Still another object of this invention is to provide timing apparatus for a watering device associated with a precision planter which will not require service and will maintain optimum operating efficiency in an uninterrupted manner throughout the busy planting season.

Still another object is to provide control apparatus for a watering device actuated in timed relationship with the precision seed planter mechanism utilizing a solenoid water control valve actuated by electrical sensing means responsive to the position of the planting dibbles of the precision seed planter.

Another object of this invention is to provide a supply of water to the seed, fertilizer and mulch at the time it is planted in the ground in order to promote rapid and efficient germination of the seedling plants.

Still another object of this invention is to provide a watering apparatus adapted to distribute a measured quantity of water to the seed, fertilizer and mulch as it is planted at accurately spaced intervals along a plant row.

Further features and advantages of this invention will appear from a detailed description of the drawings in which.

Figure 1:
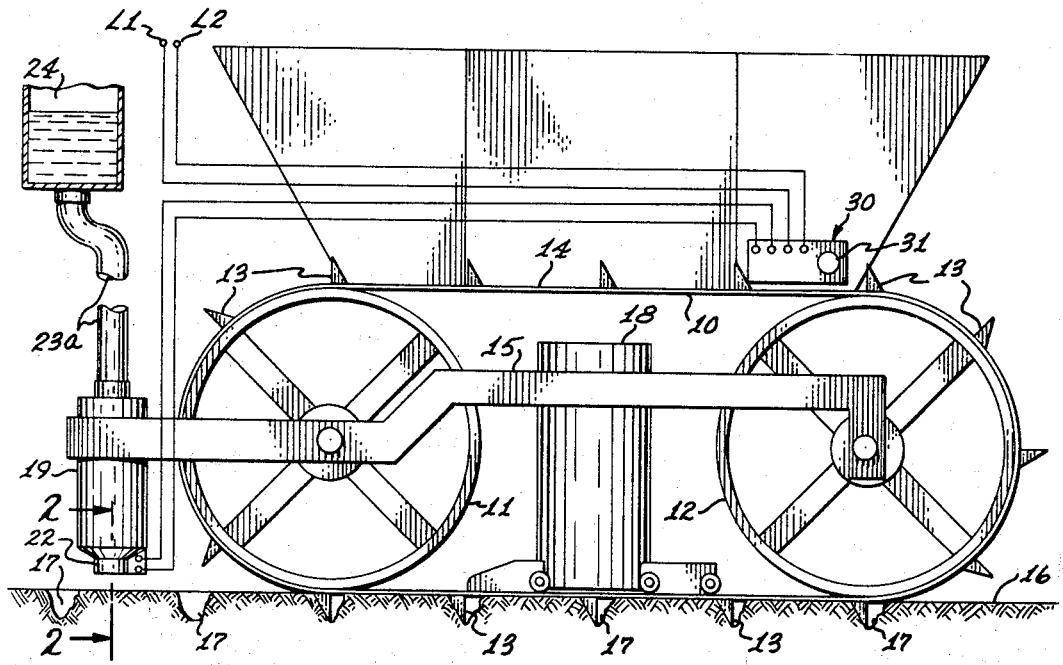
FIG. 1 is a side elevation of a precision seed planter with a watering device incorporating the features of this invention.

As an example of one embodiment of this invention, there is shown a watering apparatus particularly adapted for use with a precision seed planter, such as shown in Patent 3,154,031, issued Oct. 27, 1964, mentioned above, in which the essential elements comprise an endless flat belt 10 operating over a convex pulley 11 and a convex pulley 12 and having a series of planting fingers or dibbles 13 extending outwardly from the outer face 14 of the belt 10. The pulleys 11 and 12 are suitably journaled on a frame 15 which is suitably connected to the usual towing tractor, not shown. As the precision planter described is towed along a plant row ground surface 16 the planting dibbles 13 form longitudinally spaced planting cavities 17 in which the planting dibbles 13 and seed feed mechanism 18 deposits the required seed, fertilizer and mulch. If water is added to the seed and materials in the planting cavities 17 prior to finally crumpling in the sides of these cavities to cover over the planted materials with soil, germination and subsequent growth of the seedlings is very greatly speeded up and little plant loss results.

To this end there is provided a watering apparatus operating in synchronism with the aforementioned precision seed planter comprising a solenoid operated water valve 19 mounted on the frame 15 and having a valve plunger 20 connected to the armature 21 of the solenoid 22. The valve 19 is located at the bottom of the water supply chamber 23 which is connected by a suitable plastic hose 23$_a$ to the water supply tank 24 mounted on the towing tractor or frame 15 of the precision planter.

Figure 2:
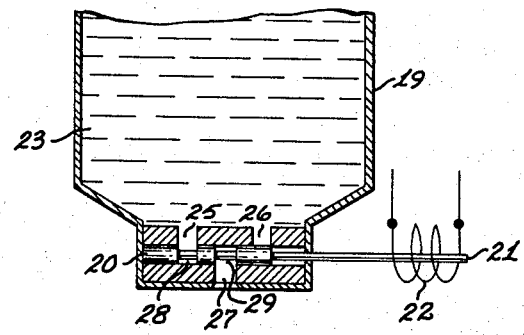
FIG. 2 is a fragmentary enlarged sectional view on the line 2—2 of FIG. 1 utilizing photo-electric control mechanism.

The valve has a pair of intake ports 25 and 26 and a discharge port 27 between which operates the valve plunger 20 having the transfer ports 28 and 29. Thus, whenever the solenoid coil 22 is energized in one direction the valve plunger 20 will be moved to the left hand position shown in FIG. 2 and when energized in the opposite direction the plunger 20 will be moved in the opposite direction to the right thus transferring measured predetermined amounts of water to the discharge port 27 from intake port 25 and intake port 26 to give the required amount of moisture to each seed planted in the cavities 17.

The water valve is actuated in accurate timed relationship to the planting cavities by energizing the solenoid 22 by a control device indicated generally at 30, one form of which is shown in FIG. 1 comprising a conventional photoelectric control switch 31 energized by a suitable light source, not shown, which is interrupted by the passage of the dibbles 13 through the light beam as the belt 10 moves along the plant row during the planting operations. A source of DC electric power is connected through leads L1 and L2 to the control switch 31. Whenever switch 31 is actuated it connects the source of power from L1 and L2 will be reversed to the solenoid coil 22 so as to shuttle the valve plunger 20 from one side to the other, each time delivering a measured quantity of water through the discharge port 27 to a planting cavity 17 in timed and registered relation thereto.

Figure 3:
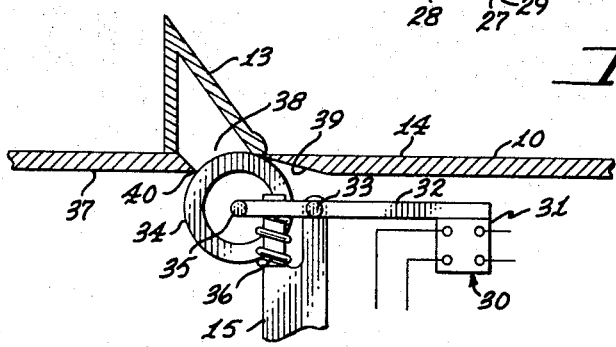
FIG. 3 is an enlarged sectional diagrammatic view of a modified control apparatus for the watering device.

In FIG. 3 is shown a modification of the actuating device for actuating the control switch 31 by direct mechanical means comprising a lever arm 32 suitably pivotally mounted at 33 on the frame 15 and having a contact roller 34 journaled on the outer end 35 and arranged to yieldingly roll by compression spring 36 against the inner face 37 of the endless belt 10 so that it will drop into the seed discharge openings 38 formed in the belt 10 in communication with the dibbles 13, the roller rolling down the sloping surface 39 of the belt 10 and then rising up over the edge 40 of the belt adjacent the opening 38 so as to provide a synchronized actuation of the switch 31 for operation of the solenoid 22 for discharge of water in the planting cavities 17 as described.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A watering apparatus for a seed planter having:
  (A) an endless planter belt operating over a pair of horizontally spaced pulleys, (B) planting dibbles projecting outwardly from the outer face of said belt for forming planting cavities in the ground surface, (C) a planter frame journaled on and supporting said pulleys and belt in operative position, (D) a watering device on said frame for presenting a predetermined measured supply of water in said planting cavities controlled by the movement of said belt and the position of the dibbles thereon, (E) a control valve including a valve plunger operable to discharge a measured quantity of water each time it is operated, (F) and means on said frame for operating said control valve comprising a photoelectric control and operating device connected to said valve and responsive to the passage of a dibble to intercept the light control beam of said photoelectric device during the movement of said belt.

2. A watering apparatus for a seed planter having:

(A) an endless planter belt having longitudinally spaced seed passageways operating over a pair of horizontally spaced pulleys, (B) planting dibbles aligned with said seed passageways projecting outwardly from the outer face of said belt for forming planting cavities in the ground surface, (C) a planter frame journaled on and supporting said pulleys and belt in operative position, (D) a watering device on said frame for presenting a predetermined measured supply of water in said planting cavities controlled by the movement of said belt and the position of the dibbles thereon, (E) a control valve including a valve plunger operable to discharge a measured quantity of water each time it is operated, (F) means on said frame for operating said valve comprising a control switch on said frame, (G) and a yieldingly mounted cam actuating roller for said switch mounted on said frame arranged to contact the inner face of said belt and to sense the seed passageways associated with the dibbles of said belt to operate said valve in timed response to the movement of said belt.

References Cited
UNITED STATES PATENTS

| | | | |
|---|---|---|---|
| 1,398,190 | 11/1921 | Howard | 111—3 |
| 1,802,273 | 4/1931 | Richards et al. | 111—3 |
| 2,625,122 | 1/1953 | Carelock | 111—3 |
| 3,154,031 | 10/1964 | Kappelmann | 111—7 |
| 3,154,032 | 10/1964 | Kappelmann | 111—3 X |
| 3,175,523 | 3/1965 | Kappelmann | 111—89 |
| 3,221,681 | 12/1965 | Snyder et al. | 111—3 |

ABRAHAM G. STONE, *Primary Examiner.*

ROBERT E. BAGWILL, *Examiner.*